United States Patent
Matsumoto

[11] Patent Number: 5,949,575
[45] Date of Patent: *Sep. 7, 1999

[54] BINOCULAR TELESCOPE

[75] Inventor: Yoshihiro Matsumoto, Inagi, Japan

[73] Assignee: Olympus Optical Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/517,260

[22] Filed: Aug. 22, 1995

[30] Foreign Application Priority Data

Aug. 23, 1994 [JP] Japan ................................ H6-198821

[51] Int. Cl.$^6$ ............................... G02B 7/06; G02B 7/11; G02B 7/12
[52] U.S. Cl. ........................ 359/412; 359/411; 359/409; 359/410; 359/413; 359/416; 359/417; 359/418
[58] Field of Search .................................... 359/412, 411, 359/409, 410, 413, 416, 417, 418

[56] References Cited

U.S. PATENT DOCUMENTS

| | | | |
|---|---|---|---|
| 3,076,381 | 2/1963 | Dowling et al. | 359/417 |
| 3,597,041 | 8/1971 | Frantz et al. | 359/411 |
| 3,923,419 | 12/1975 | Mouille | 416/107 |
| 4,284,325 | 8/1981 | Ishibau et al. | 359/417 |
| 4,370,539 | 1/1983 | Garlanov et al. | 219/121 PW |
| 4,541,299 | 9/1985 | Kanaya et al. | 74/493 |
| 4,810,083 | 3/1989 | Okada et al. | 351/205 |
| 4,886,340 | 12/1989 | Kanda | 359/411 |
| 5,381,263 | 1/1995 | Nowak et al. | 359/411 |

FOREIGN PATENT DOCUMENTS

| | | |
|---|---|---|
| 55-161205 | 12/1980 | Japan . |
| 56-126814 | 10/1981 | Japan . |
| 3-36974 | 6/1991 | Japan . |
| 4-116614 | 4/1992 | Japan . |

*Primary Examiner*—Cassandra Spyrou
*Assistant Examiner*—Mohammad Y. Sikder
*Attorney, Agent, or Firm*—Louis Weinstein

[57] ABSTRACT

A binocular telescope provided with a pair of left and right lens-barrels respectively containing optical systems, a first guide shaft for supporting these lens-barrels in such a manner that the lens-barrels can slide in a direction perpendicular to the optical axes of the optical systems and can rotate, a second guide shaft for restraining the relative tilt of the lens-barrels around this first guide shaft in such a manner that the optical axes of the left and right optical systems become parallel to each other, a first rib for holding both ends of the first guide shaft by fitting upper and lower covers to each other, and a second rib for restraining the tilt of the optical axes of the entire lens-barrels around the first guide shaft.

24 Claims, 9 Drawing Sheets

BINOCULAR TELESCOPE

BACKGROUND OF THE INVENTION

1. Field of the Invention

The present invention generally relates to a binocular telescope and more particularly relates to a binocular telescope which maintains the optical axes of a pair of optical systems thereof parallel with each other.

2. Description of The Related Art

As is well known, the distance between eyes of a person namely, the interpupillary distance varies with individual variations in age, sex and so on. Therefore, the binoculars require a mechanism for adjusting the distance between a pair of left and right lens-barrels, in order to adapt themselves to users of various interpupillary distances.

Among such interpupillary distance adjusting mechanisms, hitherto, there have been proposed various kinds of technical means of the type that adjust the interpupillary distance by moving a pair of left and right lens-barrels of a binocular telescope in parallel with each other.

As an example of such technical means, for example, the Japanese Patent Publication No. 60-46407/1985 Official Gazette describes a means for adjusting the distance between the optical axes of a pair of optical systems of a binocular telescope by placing a pair of left and right lens-barrels, which respectively hold the pair of optical systems, in such a manner that the pair of the optical axes become parallel with each other, and by further disposing a pair of front and rear guide rails or shafts in a direction perpendicular to the optical axes and by furthermore holding the left and right lens-barrels on these two guide shafts in such a manner as to be able to slide thereon. In this case, the front and rear guide shafts are illustrated in the drawing of this Official Gazette as being pressed throughout against and attached to a casing of an embodiment.

The technical means described in the Japanese Patent Publication No. 60-46407/1985 Official Gazette has a drawback in that the mechanism thereof cannot be compact in size and is a little too complex, as stated in the Japanese Patent Publication No. 60-48726/1985 Official Gazette. It is, thus, hard to say that this technical means is sufficiently durable if handled roughly.

In addition, in the case where a molding such as a plastic-molded member is employed as an armoring member, the armoring member deforms and the parallelism between the front and rear guide rails comes to be unable to be maintained if external force is applied thereto. Namely, in such a case, the parallelism between the optical axes of the optical systems respectively held by the left and right lens-barrels can not be sometimes maintained.

Further, as another example of a binocular telescope being capable of adjusting the interpupillary distance thereof, the Japanese Utility Model Publication No. 3-36974/1991 Official Gazette describes a binocular telescope having upper and lower frames for holding the left and right lens-barrels. In this telescope, a plurality of slits extending in a direction perpendicular to the optical axes of the optical systems are bored in one of the upper and lower frames. Further, an interpupillary-distance slide plate, in which guide pins slidably fitted to these slits are implanted, are slidably attached thereto in the longitudinal direction thereof. Moreover, the lens-barrels are mounted on this interpupillary-distance slide plate. Thereby, the lens-barrels are held by the frames in such manner as to be able to slide in a direction perpendicular to the optical axes of the optical systems.

The binocular telescope described in Japanese Utility Model Publication No. 3-36974/1991 Official Gazette has a structure in which a chassis (or frame) is mounted in a housing serving as the armoring member. Therefore, even if external force is exerted upon the armoring member, the parallelism between the optical axes of the left and right lens-barrels can be maintained by suitably setting the strength of this housing. This binocular telescope, however, has the serious drawbacks due to the provision of the chassis in that a further space becomes necessary in the binocular telescope and in that the weight and cost of the binocular telescope are increased.

Furthermore, as still another example of such a binocular telescope, the Japanese Patent Public Disclosure No. 4-116614 Official Gazette describes a binocular telescope in which a pair of left and right lens-barrels respectively containing optical systems are placed in such a manner as to be in parallel with each other, and in which a pair of front and rear guide shafts are placed to hold the pair of the left and right lens-barrels in such a manner that these lens-barrels can slide in a direction perpendicular to the optical axes of the optical systems, and in which each of the two front and rear guide shafts is supported on a base plate by using two columns.

The binocular telescope described in the Japanese Patent Public Disclosure No. 4-116614 Official Gazette, however, has a structure in which the base plate is provided and the parallelism between the optical axes of the optical systems is maintained by the stiffness of this base plate. This results an increase an space, weight and cost of the binocular telescope, similarly.

OBJECTS AND SUMMARY OF THE INVENTION

Accordingly, a first object of the present invention is to provide a binocular telescope which can favorably maintain the parallelism between the optical axis of a first optical system and that of a second optical system.

A second object of the present invention is to provide a binocular telescope having a simple structure, which can favorably maintain the parallelism between the optical axis of an observation optical system contained in a first lens-barrel and that of an observation optical system contained in a second lens-barrel.

A third object of the present invention is to provide a binocular telescope in which lens-barrels can be surely moved in a direction perpendicular to the optical axis of the optical system.

A fourth object of the present invention is to provide a binocular telescope which can prevent the lens-barrel from rotating around a guide means.

A fifth object of the present invention is to provide a binocular telescope which can favorably maintain parallelism between the optical axis of an observation optical system contained in a first lens-barrel and that of an observation optical system contained in a second lens-barrel even if external force is exerted on an armoring member.

To be brief, in accordance with the present invention, there is provided a binocular telescope which comprises a pair of lens-barrels placed in parallel with each other, a case containing at least pair of the lens-barrels, guide means for guiding the pair of lens-barrels in such a manner that the lens-barrels can slide in a direction in which the lens-barrels move apart from or nearer to each other, supporting means for supporting the guide means at least at one point against the case, and rotation preventing means for preventing the lens-barrels by supporting the lens-barrle at least at one point from rotating around the guide means.

Other features, objects and advantages of the present invention will become apparent from the following description of a preferred embodiment with reference to the drawings in which like reference characters designate like or corresponding parts throughout several views.

DETAILED DESCRIPTION OF THE PREFERRED EMBODIMENTS

Hereinafter, the preferred embodiments of the present invention will be described in detail by referring to the accompanying drawings.

Figure 1:
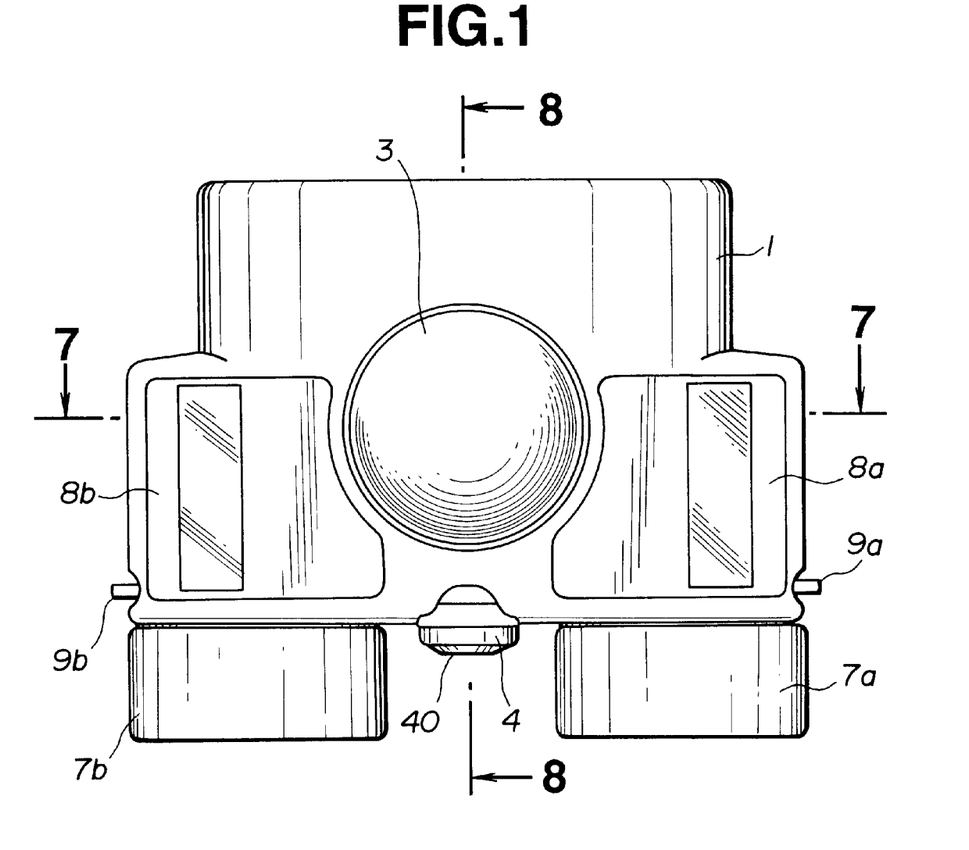
FIG. 1 is a plan view of a binocular telescope embodying the present invention, namely, a first embodiment of the present invention.
Figure 2:
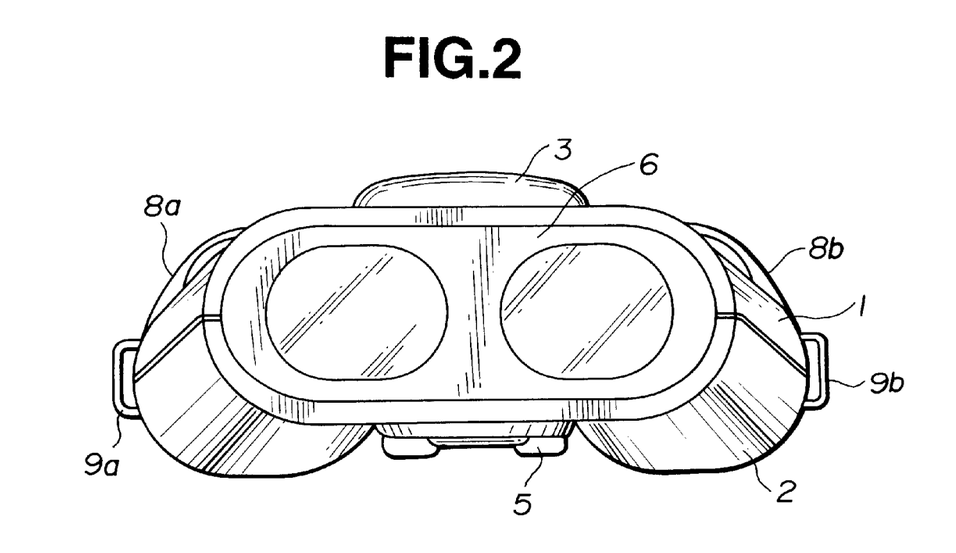
FIG. 2 is a front view of the binocular telescope embodying the present invention, namely, the first embodiment.
Figure 3:
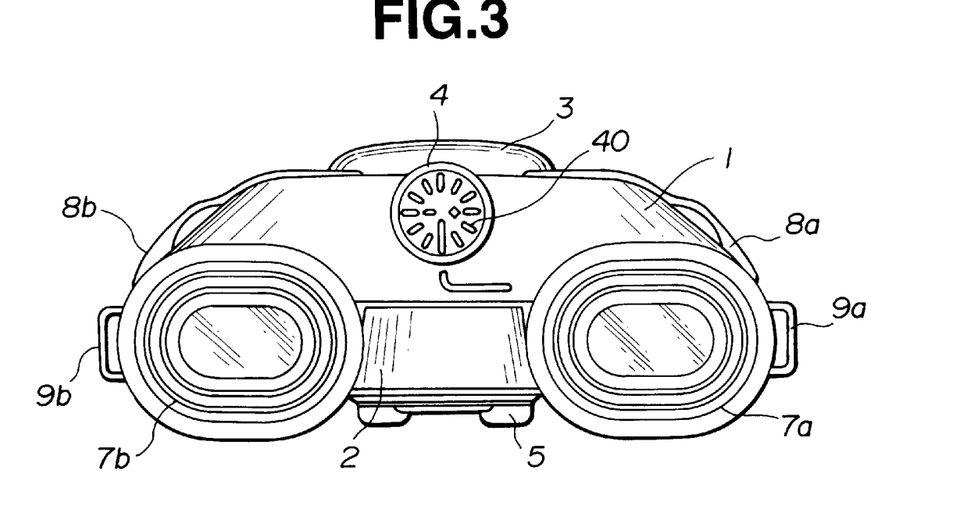
FIG. 3 is a rear view of the binocular telescope embodying the present invention, namely, the first embodiment.
Figure 4:
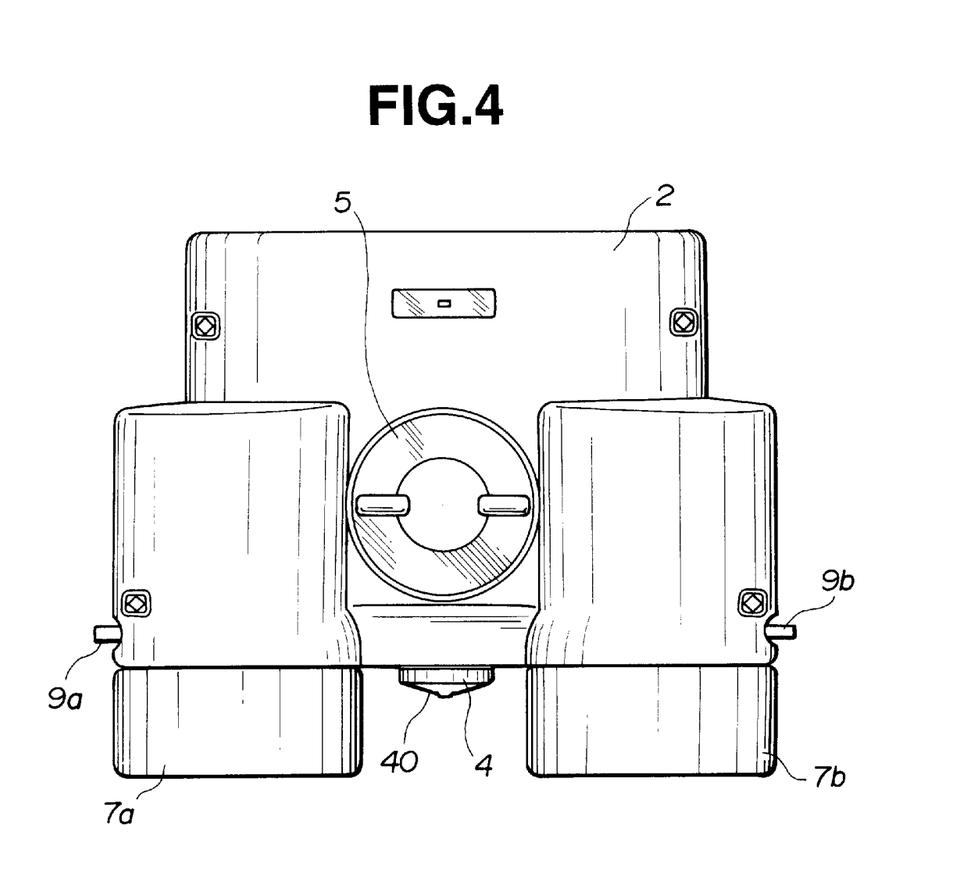
FIG. 4 is a bottom view of the binocular telescope embodying the present invention, namely, the first embodiment.
Figure 5:
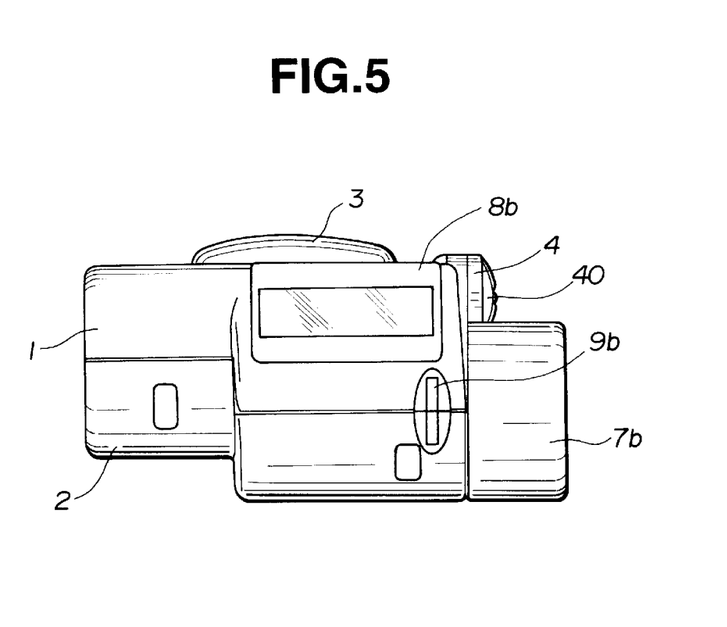
FIG. 5 is a side view of the binocular telescope embodying the present invention, namely, the first embodiment.

FIGS. 1 to 11 illustrate the first embodiment of the present invention. FIG. 1 is a plan view of a binocular telescope embodying the present invention, namely, the first embodiment of the present invention. FIG. 2 is a front view of this binocular telescope viewed from the objective lens side thereof. FIG. 3 is a rear view of this binocular telescope viewed from a direction opposite to the direction in the case of FIG. 2, namely, viewed from the eye-piece side thereof. FIG. 4 is a bottom view of this binocular telescope. FIG. 5 is a side view of this binocular telescope.

This binocular telescope has upper and lower half parts respectively covered with an upper cover 1 and a lower cover 2 which compose a housing serving as a casing of the binocular telescope.

The upper cover 1 has a nearly disk-like distance adjusting knob 3 serving as a focusing adjustment mechanism operating member provided in the nearly central portion thereof. Further, for the purpose of improving the portability and the ability to hold the binocular telescope, grip rubbers 8a and 8b made of rubber are provided on both of the left and right sides of distance adjusting knob 3.

Further, a diopter knob 4 serving as a rotary type operating member for adjusting the diopter is attached to the eye-piece side face of the upper cover 1 in such a manner as to project therefrom. Moreover, a calibrated diopter cover 40 is mounted on an eye-pieceside end face of a diopter knob 4.

Furthermore, an interpupillary distance adjusting knob 5 serving as a rotary operating member for adjusting the interpupillary distance is attached to the nearly central portion of the bottom face of the lower cover 2.

Further, a front cover 6 consisting of a transparent protective member is attached to the objective-lens side face of the binocular telescope so as to prevent a foreign substance or the like from entering the inside of the binocular telescope.

On the other hand, eye-piece rubbers 7a and 7b, each of which is made of rubber and is shaped into a cylinder having a nearly elliptical section, are attached to the eye-piece side face of the binocular telescope.

Moreover, suspending rings 9a and 9b, to which a (not shown) is attached, are fitted to the side portions of the binocular telescope, which are juncture portions between the upper cover 1 and the lower cover 2.

Figure 6:
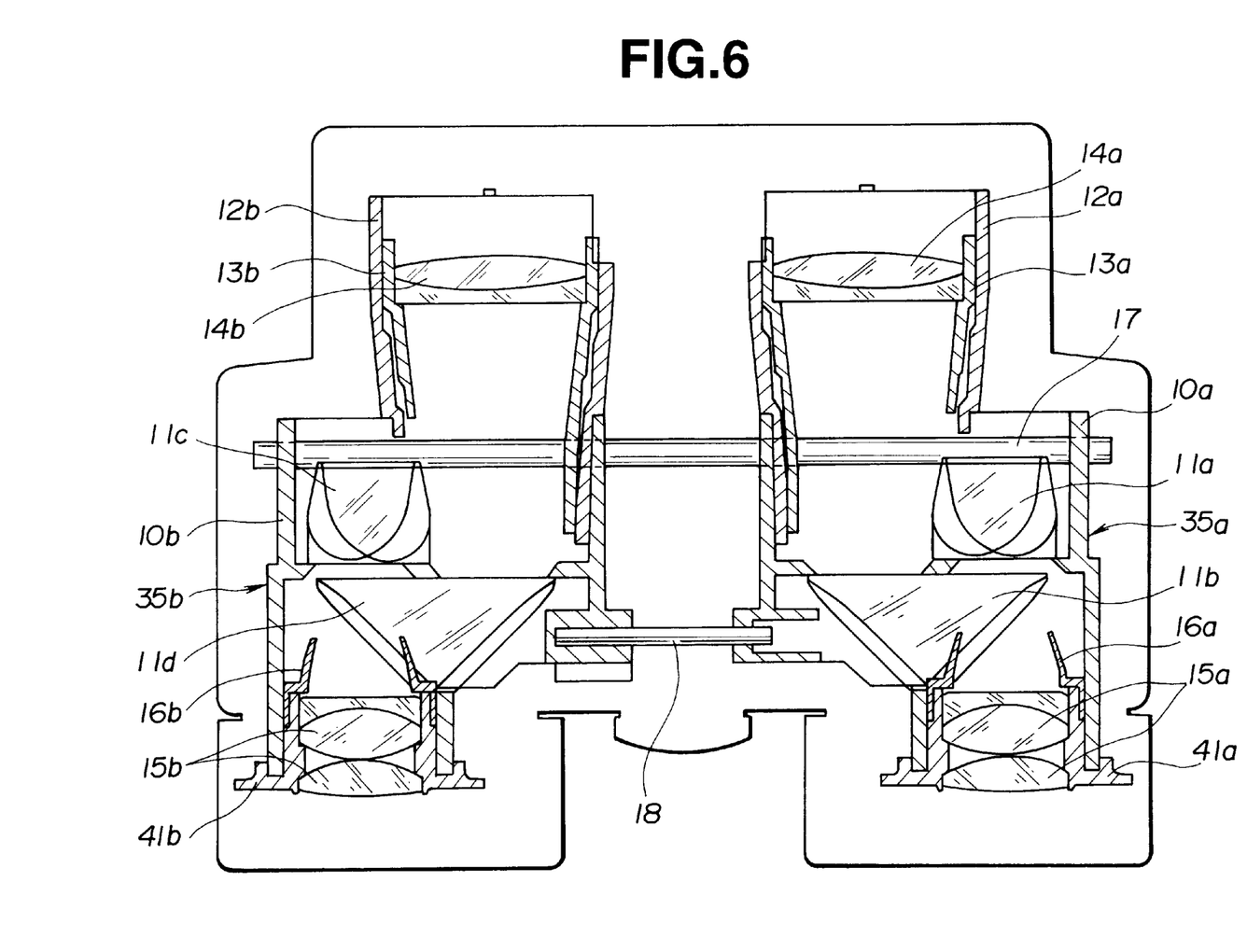
FIG. 6 is a schematic sectional plan view of optical systems of the binocular telescope embodying the present invention, namely, the first embodiment.

The configuration of the optical systems of the binocular telescope having the aforementioned appearance is schematically illustrated in FIG. 6.

The lens-barrels for holding the optical systems are a pair of left and right lens-barrels 35a and 35b made of a metal, a resin and the like. Each of the lens-barrels 35a and 35b consists mainly of a lens-barrel objective portion 12a or 12b, a lens-barrel body portion 10a or 10b and a lens-barrel eye-piece portion 41a or 41b.

Among these portions, the lens-barrel body portions 10a and 10b hold a pair of prisms 11a and 11b and another pair of prisms 11c and 11d therein, respectively.

The lens-barrel objective portions 12a and 12b are fixed to the front parts of the lens-barrel body portions 10a and 10b by being glued thereto, respectively. Further, objective lens frames 13a and 13b are fitted to the inner surface parts of the lens-barrel portions 12a and 12b holding objective (compound) lenses 14a and 14b, each of which consists of a plurality of lenses, in such a manner as to be able to slide in the direction of the optical axis with the intention of performing a focusing adjustment operation and a diopter movement or adjustment.

Moreover, eye-piece lens frames 41a and 41b serving as lens-barrel piece portions are fastened to the rear parts of the lens-barrel body portions 10a and 10b with screws, respectively. Eye-piece (compound) lenses 15a and 15b, each of which consists of a plurality of lenses, are held on the inner surfaces of the eye-piece lens frames 41a and 41b. Furthermore, field stops 16a and 16b are also attached to the objective-lens side parts of the objective lens frames 41a and 41b, respectively.

Two lens-barrels 35a and 35b, which are a pair of left and right lens-barrels as described above, will be described hereinbelow.

Such lens-barrels 35a and 35b are suspended by two guide shafts, namely, a relatively long first guide shaft 17 serving as both a guide member and a supporting means and a relatively short second guide shaft 18 also serving as a guide member and a restraining means, in such a manner as to be slidably guided.

Figure 7:
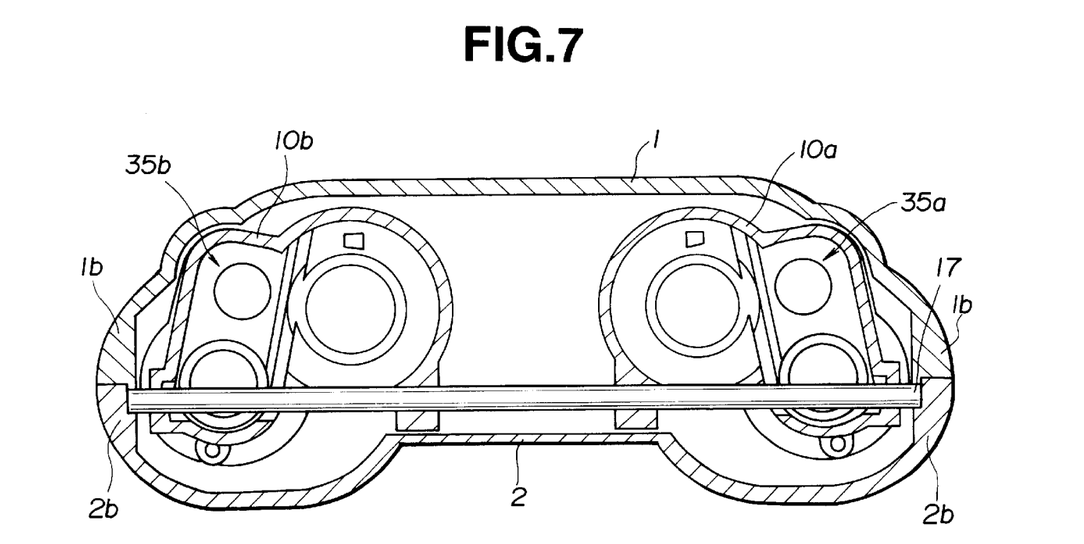
FIG. 7 is a sectional view taken on line 7-7 of FIG. 1.

The first guide shaft 17 is fixed to the binocular telescope by putting both ends thereof between the upper cover 1 and the lower cover 2 as illustrated in FIG. 7 which is a sectional view taken on line 7—7 of FIG. 1.

Namely, ribs 1b and 2b are formed on both sides of the upper cover 1 and the lower cover 2, respectively. When the binocular telescope is assembled by fitting the upper cover 1 and the lower cover 2 to each other, the first guide shaft 17 is fixed therebetween by getting both ends thereof caught in concave portions formed in the upper ribs 1b and the lower ribs 2b.

Figure 9:
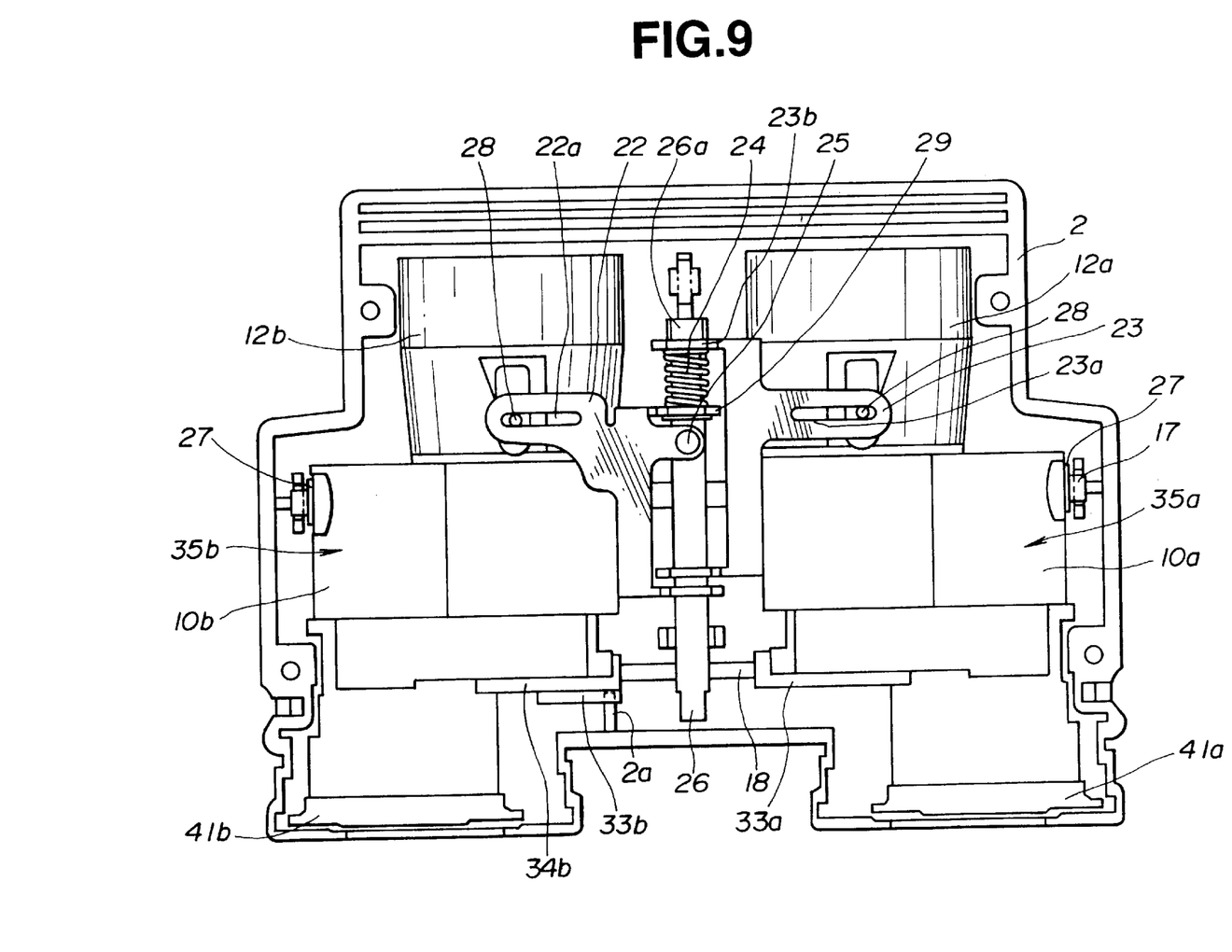
FIG. 9 is a plan view of an internal structure of the binocular telescope, namely, the first embodiment, which is exposed by removing an upper cover serving as an armoring member thereof.

This first guide shaft 17 is fitted vertically to the lens-barrel body portions 10a and 10b, each of which comprises a part of the corresponding one of the lens-barrels 35a and 35b, through a sleeve 27 (see FIG. 9 and so on). The lens-barrel body portions 10a and 10b are provided in such a manner as to be able to freely move along the first guide shaft 17 in a direction perpendicular to the optical axes.

Moreover, the second guide shaft 18 has a left end portion glued and fixed to the lens-barrel body portion 10b and further has a right end portion slidably fitted into the lens-barrel body portion 10a.

Namely, an arm part 34b is provided on the lens-barrel body portion 10b in such a manner as to protrude therefrom and extend toward the other lens-barrel body portion 10a. An end part of the second guide shaft 18 is fixedly implanted in this arm part 34b.

Further, an arm part 33a is provided on the lens-barrel body portion 10a in such a manner as to face the arm part 34b and to protrude therefrom perpendicular to the optical axis of the corresponding optical system. The second guide shaft 18 is fitted into this arm part 33a in such a manner as to be able to slide in the direction along which shaft 18 extends.

As described above, the first guide shaft 17 is placed in such a manner as to be perpendicular to the optical axes of the lens-barrels 35a and 35b. The position of the second guide shaft 18 is adjusted in such a manner that the shaft 18 becomes parallel to the first guide shaft 17.

Thus, the left and right lens-barrels 35a and 35b are configured in such a manner as move apart from or nearer to each other along the first and second guide shafts 17 and 18 when performing an interpupillary distance adjustment (to be described later).

Figure 8:
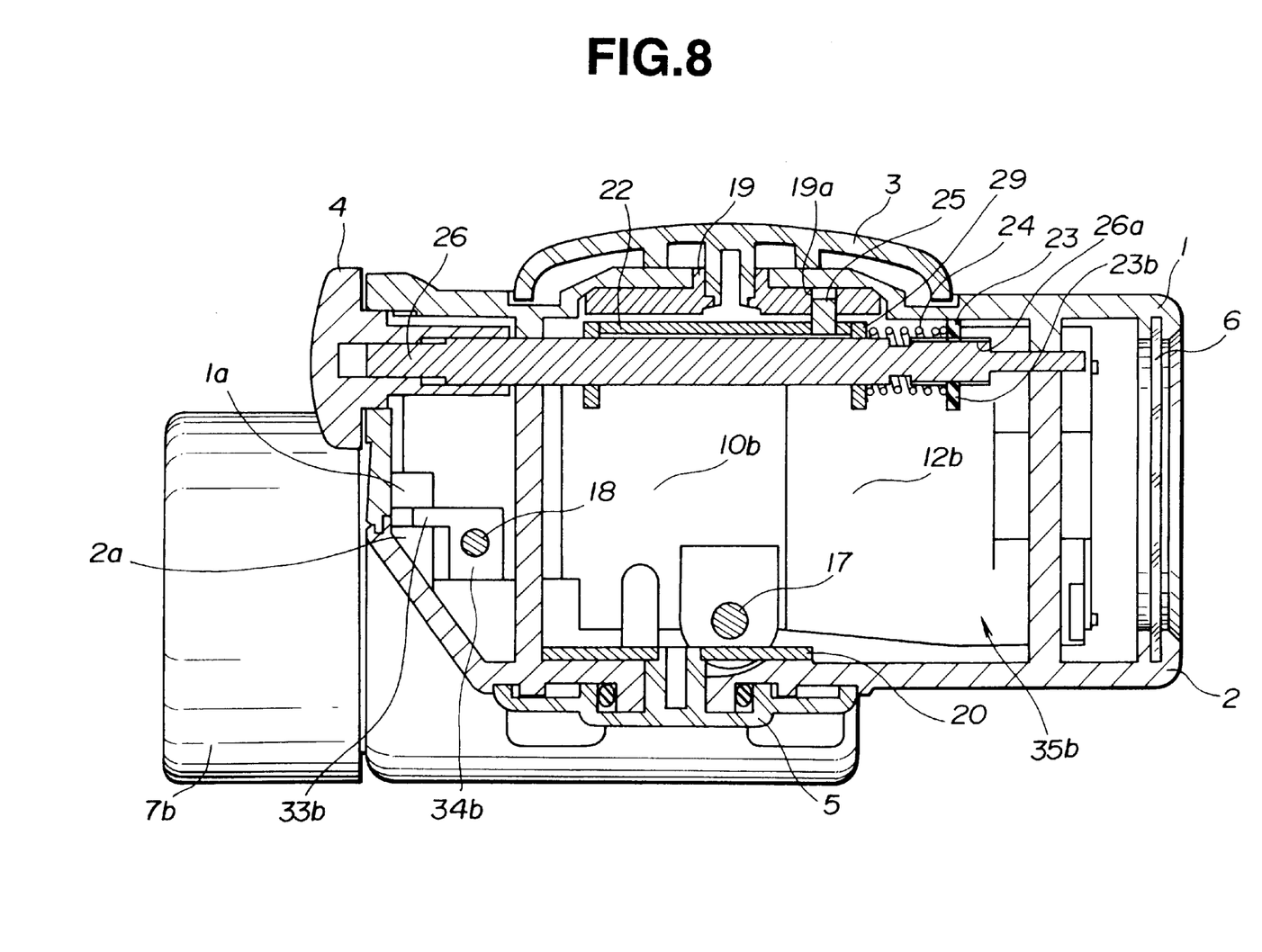
FIG. 8 is a sectional view taken on line 8-8 of FIG. 1.

Moreover, a rib 33b is formed on the arm part 34b projected from the lens-barrel body portion 10b in such a way as toward protrude to the eye-piece, as illustrated in FIG. 9. This rib 33b is put into a groove portion formed between the upper cover 1 and the lower cover 2, as illustrated in FIG. 8, so that the rib 33b is able to slide along the second guide shaft 18.

Namely, in a portion between the lens-barrel body portions 10a and 10b and between the eye-piece-side part of the upper cover 1 and that of the lower cover 2, ribs 1a and 2a, each of which serves as a holding portion, are formed on the upper cover 1 and the lower cover 2, respectively. Further, when the binocular telescope is assembled by fitting the upper cover 1 and the lower cover 2 to each other, the rib 33b projected from the arm part 34b is held between these ribs 1a and 2a. Thereby, the rotation of the lens-barrels 35a and 35b around the first guide shaft 17 is restricted to a minimum limit.

Figure 11:
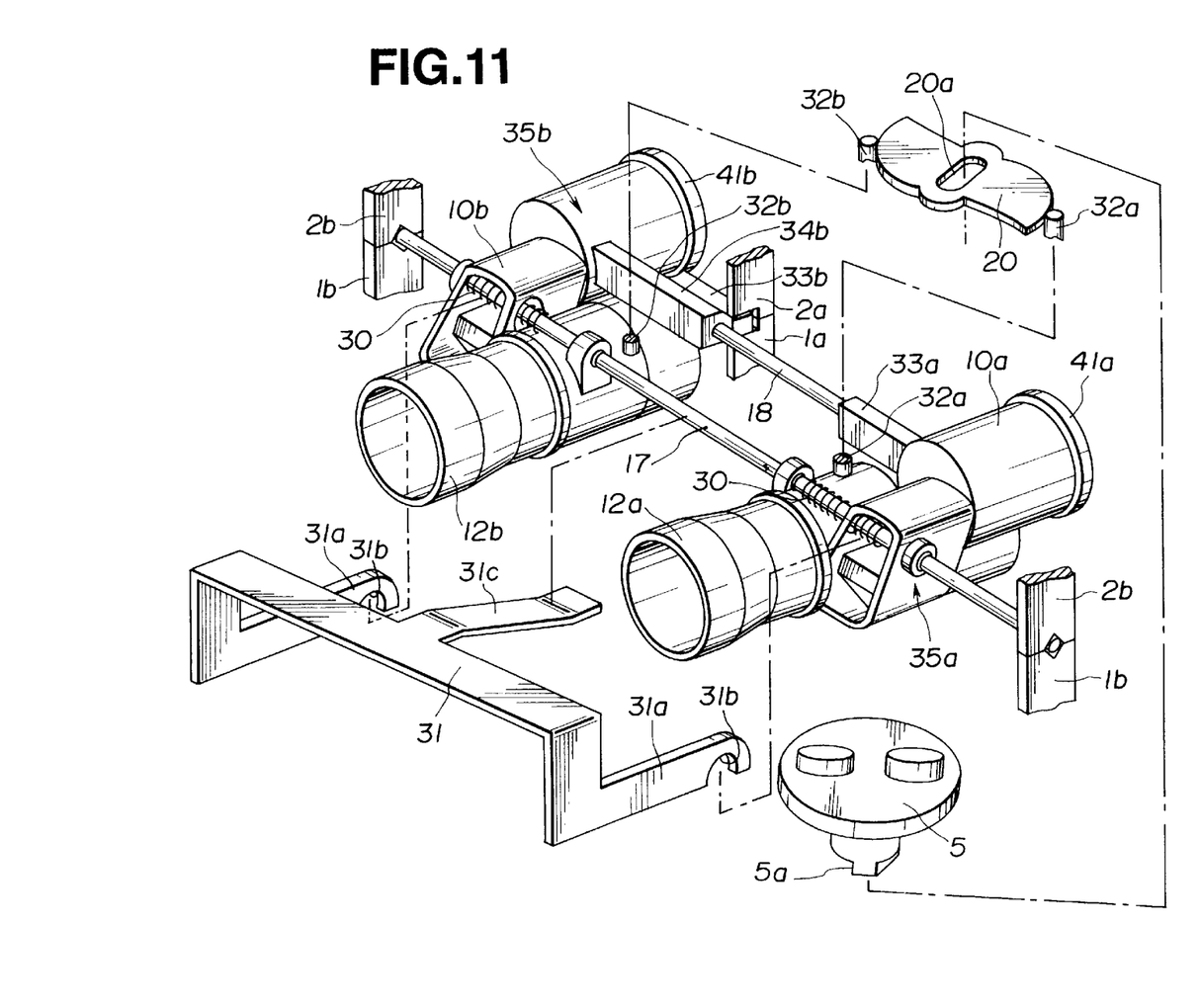
FIG. 11 is an exploded perspective view of a lens-barrel holding mechanism of the binocular telescope embodying the present invention, namely, the first embodiment.

Thus, the position of the lens-barrels 35a and 35b are fixed by the aforementioned three-point support or suspension. Further, the three points utilized as support points are not on a same line and are thus independent of one another as illustrated in FIG. 11. A point supported between the ribs 1a and 2a and two points supported between the ribs 1b and 2b are located as three vertices of a nearly isosceles triangle.

Incidentally, even if an external force is applied to the upper cover 1 and the lower cover 2, this external force is not exerted directly on the first guide shaft 17 and the second guide shaft 18 owing to the elasticity of the ribs 1a, 2a, 1b and 2b. Thus, the parallelism between the optical axes of the optical systems respectively contained in the lens-barrels 35a and 35b is favorably maintained.

Next, FIGS. 8 and 9 are diagrams for illustrating the configurations of a diopter adjusting mechanism and a focusing adjustment mechanism. FIG. 8 is a sectional view taken on line 8—8 of FIG. 1. FIG. 9 is a plan view of the internal structure of the binocular telescope, which is shown by removing the upper cover 1 serving as an armoring member thereof.

In the case of this binocular telescope, the diopter movement or adjustment and the focusing adjustment are performed by letting out or in the objective lenses 14a and 14b. Namely, a mechanism for letting out the objective lenses 14a and 14b is divided into two mechanisms, namely, a diopter adjusting mechanism and a focusing adjustment mechanism.

First, one of these mechanisms, namely, the diopter adjusting mechanism will be described hereinbelow.

Diopter movement or adjustment is performed by letting out or in only the right objective lens 14a as illustrated in FIG. 6.

When turning the diopter knob 4, an objective screw 26 fitted to this diopter knob 4 through an oval shape portion in such a manner as to be able to rotate together with the knob 4 as a one-piece arrangement follows the rotation of the knob 4 and turns.

This objective screw 26 is a spindle-like member provided in an upper portion located nearly midway between the left and right lens-barrels 35a and 35b of this binocular telescope in such a manner as to be put between the upper cover 1 and the lower cover 2 along the optical axis.

A screw 26a is threaded on the peripheral surface of a tip portion of the objective screw 26 and is threaded into an arm portion 23b extending from the objective side face of a right arm member 23. Further, as a result of turning this objective screw 26, the right arm member 23 is let out or in along the direction of the optical axis.

As shown in FIG. 9, a laterally elongated hole 23a extending in a direction perpendicular to the optical axis is bored in this right arm member 23. A tip portion of a pin 28 pushed into the objective lens frame 13a engages with this elongated hole 23a.

Thereby, as the right arm member 23 is let out or in, the right objective lens frame 13a follows the movement of the right arm member 23 and moves in the direction of the optical axis. The diopter movement or adjustment is thus performed.

Next, the focusing adjustment mechanism will be described hereinbelow.

A distance adjusting cam 19 is fastened to the distance adjusting knob 3 with screws through the upper cover 1, so that the distance adjusting knob 3 and the distance adjusting cam 19 are integrally joined with each other and rotate as one piece.

This distance adjusting cam 19 is a member in which a cam groove 19a is made. Further, a distance adjusting pin 25 crimped by a left arm member 22 is inserted into this cam groove 19a.

This left arm member 22 is attached to the objective screw 26 through an E-ring 29. Thereby, the left arm member 22 and the objective screw 26 move in the direction of the optical axis as one piece.

A diopter spring 24 inserted through the objective screw 26 is provided between the E-ring 29 of the left arm member 22 and the arm portion 23b of the right arm member 23. Thereby, the distance between the left arm member 22 and the right arm member 23 is always maintained at a constant value.

Similarly as in the case of the right arm member 23, an arm portion is protruded from the side of this left arm member 22 and a laterally elongated hole 22a is bored therein in a direction perpendicular to the optical axis. The pin 28 pushed into the objective lens frame 13b engages with this elongated hole 22a.

When the distance adjusting knob 3 of FIG. 8 is turned in such a configuration, the distance adjusting cam 19 and the knob 3 turn as one piece. Thus the left arm member 22 follows the rotation of this distance adjusting cam 19 and starts moving in the direction of the optical axis.

When the left arm member 22 starts moving in this way, the objective screw 26 attached to this left arm member 22 through the E-ring 29 starts moving simultaneously. Moreover, the objective screw 26 and the right arm member 23 start moving in the same direction as the direction in which the left arm member 22 moves.

In this manner, the left arm member 22 and the right arm member 23 move in the same direction as one piece. Thereby, the objective lens frames 13a and 13b respectively holding the objective lenses 14a and 14b follow the movement of the arm members 22 and 23 and move in the direction of the optical axis. Thus, these frames 13a and 13b are simultaneously let out or in by the same length. Namely, the focusing adjustment is performed.

Next, the interpupillary distance adjusting mechanism will be described hereinbelow by referring to FIGS. 8 to 11.

As illustrated in FIG. 8, the interpupillary distance adjustment is performed by turning the interpupillary distance adjusting knob 5 serving as an operating member to thereby change the distance between the left and right lens-barrels 35a and 35b.

This interpupillary distance adjusting knob 5 is fastened through the lower cover 2 to the interpupillary distance adjusting cam 20, serving as an adjusting member, with screws, so that the knob 5 and the cam 20 rotate as one piece.

Figure 10:
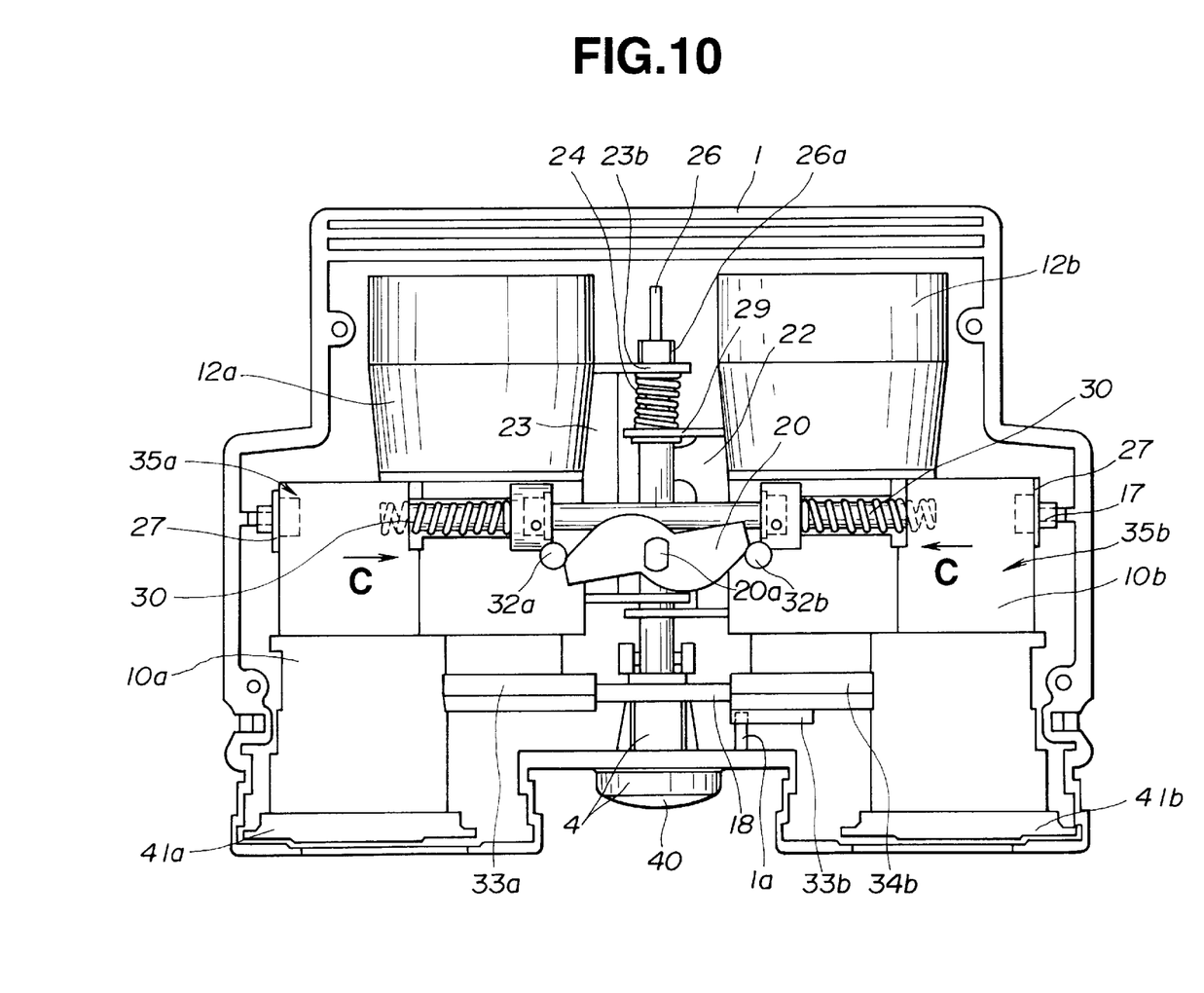
FIG. 10 is a bottom view of an internal structure of the binocular telescope, namely, the first embodiment, which is exposed by removing a lower cover serving as an armoring member thereof.

More particularly, this interpupillary distance adjusting cam 20 is a plate-like member which has an oval hole portion 20a bored in the central portion thereof and further has a cam face formed in an edge portion thereof. The cam 20 is screwed to the lower cover 2 by fitting a convex portion 5a of the interpupillary distance adjusting knob 5 into the hole portion 20a and putting the lower cover 2 therebetween in such a manner that the knob 5 can rotate with respect to the lower cover 2.

As illustrated in FIG. 10, this interpupillary distance adjusting cam 20 is placed at a position in such a manner that the center of rotation of the cam 20 is located in the vicinity of the first guide shaft 17. The cam 20 has a cam face formed in such a manner as to be almost symmetric with respect to this center of rotation thereof. Cam-follower pins 32a and 32b respectively protruded from the lens-barrel body portions 10a and 10b are brought into abutting engagement with this cam face.

Each interpupillary distance adjusting spring 30, which is constituted by a coiled spring or the like and serves as a pushing member, pierces through the first guide shaft 17 in the proximity of the side of each of the cam-follower pins 32a and 32b. An end portion of each of the interpupillary distance adjusting springs 30 at the side of the central portion of the binocular telescope engages with a projection portion protruded from the corresponding one of the lens-barrel body portions 10a and 10b. The opposite end portion of each of the interpupillary distance adjusting springs 30 at the side of the binocular telescope engages with and is attached to a spring hanger 31 of FIG. 11.

Thereby, the lens-barrel body portions 10a and 10b are pushed by the interpupillary distance adjusting springs 30 in the direction of an arrow C of FIG. 10 in such a manner that the cam-follower pins 32a and 32b are always put in abutting engagement with the interpupillary distance adjusting cam 20.

This spring hanger 31 has an arm portion 31a which engages with and catches the corresponding interpupillary distance adjusting spring 30 and extends from each end portion thereof as illustrated in FIG. 11. Further, a recess portion 31b engaging with the first guide shaft 17 is formed in a tip end portion of each of the arm portions 31a. Moreover, another arm portion 31c extends from a part between the arm portions 31a.

Thereby, the lens-barrel body portions 10a and 10b are always pushed by the interpupillary distance adjusting springs 30, respectively, in the (opposite) directions in which the portions 10a and 10b come nearer to each other. Moreover, the lens-barrel body portions 10a and 10b undergo a pushing force exerted by the interpupillary distance adjusting cam 20 in a direction intersects the guiding direction which of the first guide shaft 17.

In the mechanism having such a configuration, when the interpupillary distance adjusting knob 5 is rotated, the interpupillary distance adjusting cam 20 is rotated in such a manner as to be integral with the knob 5. Moreover, the lens-barrel body portions 10a and 10b are moved by the cam-follower pins 32a and 32b put into abutting engagement with the cam face of the cam 20 in such a manner as to follow the motion of the cam 20.

At that time, the lens-barrels 35a and 35b respectively containing the lens-barrel body portions 10a and 10b are slidably held by the two guide shafts, namely, by the first guide shaft 17 and the second guide shaft 18, respectively, as described above. Therefore, the lens-barrels 35a and 35b are moved by the rotation of the interpupillary distance adjusting cam 20 in the directions in which these lens-barrels come away from or nearer to each other. Thus, the interpupillary distance is adjusted.

Further, as illustrated in FIG. 9, the elongated hole 22a bored in the left arm member 22 and the elongated hole 23a bored in the right arm member 23 are laterally elongated in the direction perpendicular to the optical axis. Thus the diopter and the position of the objective lenses at the time of achieving the focusing do not change even if the objective lens frames 13a and 13b, into which the pins 28 engaging with these elongated holes 22a and 23a are respectively pushed, move laterally by sliding and the interpupillary distance is changed by means of the interpupillary distance adjusting cam 20.

As described hereinabove, in the case of such a first embodiment, the left and right lens-barrels are held at three points in total, namely, two points, at which both ends of the first guide shaft 17 are fixed, and a restraining point at which the rotation of the lens-barrels around the first guide shaft is restrained. Thus the parallelism between the optical axes of the optical systems contained in the left and right lens-barrels can be favorably maintained. Even if the casing deforms, the parallelism between the optical axes of the optical systems contained in the left and right lens-barrels is hardly affected.

Figure 12:
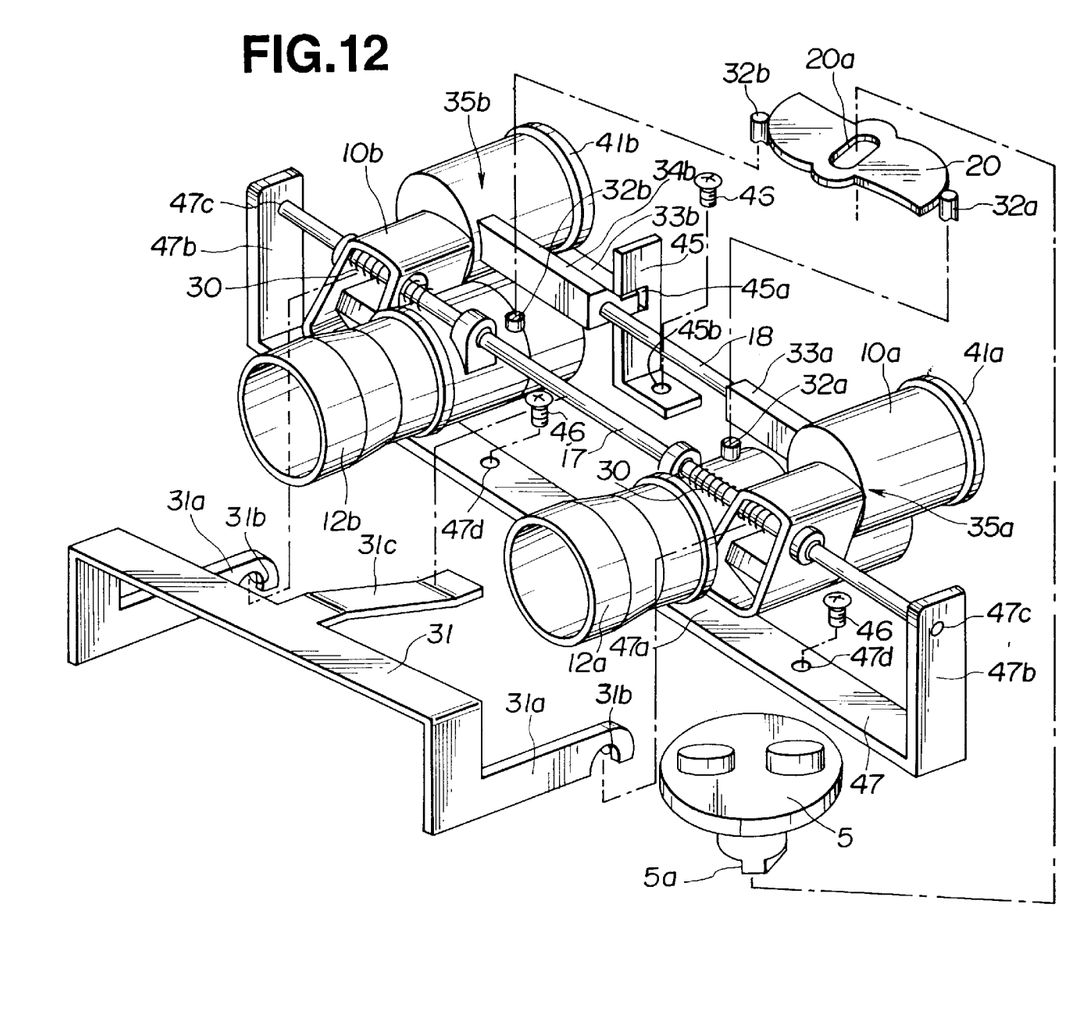
FIG. 12 is an exploded perspective view of a lens-barrel holding mechanism of another binocular telescope embodying the present invention, namely, a second embodiment of the present invention.

FIG. 12 illustrates the configuration of the second embodiment of the present invention and is an exploded perspective view of a lens-barrel holding mechanism thereof. Regarding this second embodiment, the descriptions of parts similar to the corresponding parts of the first embodiment are omitted. Namely, only the differences between the first and second embodiments will be mainly described hereinbelow.

In this second embodiment, both end portions of the first guide shaft 17 are supported by a supporting member 47.

This supporting member 47 is made by bending an elongated plate-like member like a character "U". Namely, arm portions 47b are almost vertically extended from both ends of a main body 47a thereof.

Supporting holes 47c are bored in the arm portions 47b, respectively. Further, the first guide shaft 17 is supported by fitting each of ends thereof one of the supporting holes 47c, respectively.

Moreover, a plurality of tapped holes 47d are drilled in the main body 47a. Further, small screws 46 are threaded into the tapped holes 47d. Thereby, the supporting member 47 is fixed to the upper cover 1.

Furthermore, the rib 33b of the arm part 34b protruded from the main body portion 10b of the lens-barrel 10b is engaged with an engaging member 45.

This engaging member 45 is a plate-like member bent like a character "L" and has a rectangular concave portion 45a, which engages with the rib 33b, and a tapped hole 45b, into which one of the small screws 46 is threaded so as to mount this engaging member 45 to the upper cover 1.

Thereby, the engaging member 45 restrains the lens-barrels 35a and 35b from rotating around the first guide shaft 17 supported by the supporting member 47.

Incidentally, in the case of the aforementioned mechanism, the supporting member 47 and the engaging member 45 are fixed to the upper cover 1. These members 45 and 47, however, may be fixed to the lower cover 2.

In the case of such a second embodiment, the first guide shaft is supported by the supporting member separated from the armoring member. Moreover, the rotation of the lens-barrels around this first guide shaft is restrained by the engaging member separated from the armoring member. Consequently, the second embodiment can obtain effects nearly similar to those of the first embodiment.

Incidentally, in the case of each of the aforementioned embodiments, both of a means for supporting the first guide shaft and a means for restraining the rotation of the lens-barrels around the first guide shaft are provided in such a manner as to be integral with the armoring member. Alternatively, both of these means are provided in such a manner as to be separated from the armoring member. It is, however, apparent that one of these means may be provided in such a manner as to be integral with the armoring member and the other of these means may be provided in such a way as to be separated from the armoring member.

Additionally, in the aforementioned embodiments, the lens-barrels 35a and 35b are guided by the first guide shaft 17, the sleeves 27, the second guide shaft 18 and the arm parts 33a and 34b in the direction perpendicular to the optical axis. However, means for guiding these lens-barrels in the direction perpendicular to the optical axis are not limited thereto. Namely, these lens-barrels may be guided in such a direction by using, for example, a dovetail groove, the combination of a shaft and a bush, the combination of an elongated hole and a pin, or the combination of a screw and a nut.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A binocular telescope comprising:
   a pair of lens-barrels each containing an observation optical system;
   first guide means including a first rod-like guide arranged such that said observation optical systems can move along said first guide in a direction perpendicular to optical axes of said observation optical systems only one end of said guide being fixed to a fixing member;
   second guide means including a rod-like member provided on one of said lens-barrels and a slide portion provided on the other lens-barrel, said slide portion being in sliding engagement with said member, in order that said pair of observation optical systems are kept in parallel to each other, thereby making it possible that said second guide means rotates with said first guide as a center of rotation; and
   restraining means provided on said fixing member so as to restrain said second guide means from rotating about said first guide as the center of rotation, said restraining means holding only one point of said second guide means, and said second guide means being able to slide in said restraining means, wherein said pair of lens-barrels are kept in parallel to each other even if said fixing member is deformed.

2. A binocular telescope according to claim 1, wherein said rod-like member is column-shaped.

3. A binocular telescope according to claim 1, wherein said fixing members are appearance members of the binocular telescope.

4. A binocular telescope according to claim 1, wherein said rod-like member is column-shaped.

5. A binocular telescope according to claim 1, wherein said fixing members are appearance members of the binocular telescope.

6. A binocular telescope according to claim 4 wherein said second guide shaft is arranged between said lens-barrels and extends into openings provided in said lens-barrels.

7. A binocular telescope according to claim 4 wherein said second shaft moves together with only one of said lens-barrels while slidably engaging the other lens-barrel.

8. A binocular telescope comprising:
   a pair of lens-barrels each containing an observation optical system;
   first guide means including a first rod-like guide arranged such that said observation optical systems can move along said first guide in a direction perpendicular to optical axes of said observation optical systems, only one end of said guide being fixed to a fixing member;
   second guide means including a rod-like member fixed to one of said lens-barrels and a slide portion provided to the other lens-barrel, said slide portion slidably engaging said member, in order that said pair of observation optical systems are maintained in parallel, thereby making it possible that said second guide means rotates with said first guide as a center of rotation; and restraining means provided to said fixing member to restrain said second guide means from rotating with said first guide as the center of rotation, wherein said pair of lens-barrels are maintained in parallel to each other even if said fixing member is deformed.

9. A binocular telescope according to claim 8, wherein said rod-like member is column-shaped.

10. A binocular telescope according to claim 8, wherein said fixing members are appearance members of the binocular telescope.

11. A binocular telescope comprising:

a pair of lens-barrels each containing an observation optical system;

first guide means including a first rod-like guide arranged such that said observation optical systems are supported to be rotatable with the axis of said rod-like guide as a center of rotation and can move along said rod-like guide in a direction perpendicular to optical axes of said observation optical systems, only one end of said guide being fixed to a fixing member;

second guide means including a rod-like member provided to one of said lens-barrels and a slide portion provided to another one of the lens-barrels, said slide portion being in sliding engagement with said member, in order that said pair of observation optical systems are maintained in parallel to each other, thereby making it possible that said second guide means rotates with said first guide as a center of rotation; and restraining means provided to said fixing member to restrain said second guide means from rotation with said first guide as the center of rotation, said restraining means holding said second guide means at only one point, and said second guide means being able to slide in said restraining means, wherein said pair of lens-barrels are maintained in parallel to each other even if said fixing member is deformed.

12. A binocular telescope comprising:

a first guide shaft for supporting a pair of left and right lens-barrels which have optical axes parallel to each other and being movable such that they can move in a direction perpendicular to said optical axes, at least one end of said first guide shaft being fixed to a case containing said pair of lens-barrels;

a second guide shaft for supporting said pair of lens-barrels with a degree of freedom relative to said case when said pair of lens-barrels move in a direction perpendicular to their optical axes, said second guide shaft being movable relative to said case; and rotation preventing means for slidably supporting only one of said pair of lens barrels with respect to said case in a vicinity of said second guide shaft and preventing said pair of lens-barrels from rotating with said first guide shaft as a center of rotation when said pair of lens-barrels slide, wherein said rotation is prevented by cooperation of only one supporting part of said guide shaft and a supporting part of said rotation preventing means.

13. A binocular telescope according to claim 12, wherein said rotation preventing means is composed of a guide portion provided on only one of said pair of lens-barrels and extending in a direction perpendicular to the optical axis of said lens-barrel and a groove portion provided in said case and slidably engaging said guide portion.

14. A binocular telescope according to claim 12, wherein one end of said second guide shaft is fixed to one of said pair of lens-barrels, and the other end of said second guide shaft is slidably fitted into a hole provided in the other lens barrel, so that said pair of lens-barrels can move in a direction in which they are further apart or nearer to each other.

15. A binocular telescope according to claim 12, wherein one of said pair of lens-barrels is provided with a guide portion which extends in a direction perpendicular to the optical axis thereof and a hole adjacent to said guide portion, the other end of said guide shaft is fixed to the other lens-barrel, and the other end of said guide shaft always slidably engages the hole to assure that said pair of lens barrels move in a direction perpendicular to said optical axes.

16. A binocular telescope comprising:

a first guide shaft for supporting a pair of left and right lens-barrels, whose optical axes are parallel to each other, so that said lens-barrels move in a direction perpendicular to said optical axes, at least one end of said first guide shaft being fixed to a case containing said pair of lens-barrels;

a second guide shaft having one end fixed to one of said pair of lens barrels and another end is slidably supported with respect to the other lens barrel;

rotation preventing means for preventing said pair of lens-barrels from rotating with said first guide shaft as a center of rotation when said pair of lens barrels slide by slidably supporting the other lens-barrel with respect to said case, wherein said rotation is prevented by at least one supporting part of said guide shaft and a supporting part of said rotation preventing means.

17. A binocular telescope according to claim 16, wherein said rotation preventing means is composed of a guide portion provided to said another lens-barrel and extends in a direction perpendicular to the optical axis of said lens barrel and a groove portion provided in said case and engaging said guide portion.

18. A binocular telescope according to claim 17, wherein said guide portion is provided with a hole which slidably engages said another end of said second guide shaft.

19. A binocular telescope according to claim 16, wherein opposite ends of said first guide shaft are fixed to said case, said rotation preventing means being provided to said the other lens-barrel and composed of a guide portion extending in a direction perpendicular to the optical axis of said lens-barrel and a groove portion provided in said case and engaging said guide portion, rotation of the lens barrels being prevented by three points of contact, namely said ends of said first guide shaft and the guide portion engaging the groove portion.

20. A binocular telescope comprising:

a pair of lens-barrels each containing an observation optical system;

first guide elements including a first rod-like guide arranged such that said observation optical systems are rotatable with an axis of said guide as a center of rotation and moveable along said guide in a direction perpendicular to optical axes of said observation optical systems, only one end of said guide being fixed to a fixing member;

second guide elements including a rod-like member provided to one of said lens-barrels and a slide portion provided to another one of the lens-barrels, said slide portion being in sliding engagement with said rod-like member, in order that said pair of observation optical systems are maintained in parallel thereby making it possible that said second guide elements can rotate with said first guide as a center of rotation; and restraining elements provided to said fixing member or fixing member to restrain aid second guide elements from rotating with said first guide as the center of rotation, said restraining elements holding only one point of said second guide elements, and said second guide elements slidable in said restraining elements, wherein said pair of lens-barrels are maintained in parallel even if said fixing member is deformed.

21. A binocular telescope comprising:

a pair of lens-barrels each containing an observation optical system;

first guide means including a first rod-like guide arranged such that said observation optical systems can move along said first guide in a direction perpendicular to optical axes of said observation optical systems wherein both ends of said guide are each fixed to a fixng member;

second guide means including a rod-like member provided on one of said lens-barrels and a slide portion provided on the other lens-barrel, said slide portion being in sliding engagement with said member, in order that said pair of observation optical systems are kept in parallel to each other, thereby making it possible that said second guide means rotates with said first guide as a center of rotation; and restraining means provided on said fixing member so as to restrain said second guide means from rotating about said first guide as the center of rotation, said restraining means holding only one point of said second guide means, and said second guide means being able to slide in said restraining means, wherein said pair of lens-barrels are kept in parallel to each other even if said fixing members are deformed.

22. A binocular telescope comprising:

a pair of lens-barrels each containing an observation optical system;

first guide means including a first rod-like guide arranged such that said observation optical systems can move along said first guide in a direction perpendicular to optical axes of said observation optical systems, both ends of said guide each being fixed to a fixing member;

second guide means including a rod-like member fixed to one of said lens-barrels and a slide portion provided to the other lens-barrel, said slide portion slidably engaging said member, in order that said pair of observation optical systems are maintained in parallel, thereby making it possible that said second guide means rotates with said first guide as a center of rotation; and restraining means provided to said fixing members to restrain said second guide means from rotating with said first guide as the center of rotation, wherein said pair of lens-barrels are maintained in parallel to each other even if said fixing members are deformed.

23. A binocular telescope comprising:

a pair of lens-barrels each containing an observation optical system;

first guide means including a first rod-like guide arranged such that said observation optical systems are supported to be rotatable with the axis of said rod-like guide as a center of rotation and can move along said rod-like guide in a direction perpendicular to optical axes of said observation optical systems, both ends of said guide each being fixed to a fixing member;

second guide means including a rod-like member provided to one of said lens-barrels and a slide portion provided to another one of the lens-barrels, said slide portion being in sliding engagement with said member, in order that said pair of observation optical systems are maintained in parallel to each other, thereby making it possible that said second guide means rotates with said first guide as a center of rotation; and restraining means provided to said fixing members to restrain said second guide means from rotation with said first guide as the center of rotation, said restraining means holding said second guide means at only one point, and said second guide means being able to slide in said restraining means, wherein said pair of lens-barrels are maintained in parallel to each other even if said fixing members are deformed.

24. A binocular telescope comprising:

a pair of lens-barrels each containing an observation optical system;

first guide elements including a first rod-like guide arranged such that said observation optical systems are rotatable with an axis of said guided as a center of rotation and moveable along said guide in a direction perpendicular to optical axes of said observation optical systems, both ends of said guide each being fixed to a fixing member;

second guide elements including a rod-like member provided to one of said lens-barrels and a slide portion provided to another one of the lens-barrels, said slide portion being in sliding engagement with said rod-like member, in order that said pair of observation optical systems are maintained in parallel thereby making it possible that said second guide elements can rotate with said first guide as a center of rotation; and restraining elements provided to said fixing members to restrain aid second guide elements from rotating with said first guide as the center of rotation, said restraining elements holding only one point of said second guide elements, and said second guide elements slidable in said restraining elements, wherein said pair of lens-barrels are maintained in parallel even if said fixing members are deformed.

* * * * *

UNITED STATES PATENT AND TRADEMARK OFFICE
CERTIFICATE OF CORRECTION

PATENT NO.  : 5,949,575
DATED       : September 7, 1999
INVENTOR(S) : Yoshihiro Matsumoto It is certified that error appears in the above-indentified patent and that said Letters Patent is hereby corrected as shown below:

At column 2, line 30, before the first occurrence of the word "an", insert therefor --in--.

At column 2, line 30, after the word "increase", delete "an" and insert therefor --in--.

At column 2, line 62, before the word "pair", delete "least" and insert therefor --a--.

At column 4, line 26, after the word "a", delete "(" and insert therefor --strap--.

UNITED STATES PATENT AND TRADEMARK OFFICE
CERTIFICATE OF CORRECTION

PATENT NO.   : 5,949,575
DATED        : September 7, 1999
INVENTOR(S)  : Yoshihiro Matsumoto It is certified that error appears in the above-indentified patent and that said Letters Patent is hereby corrected as shown below:

At column 5, line 45, after the word "as", delete "move" and insert therefor --to--.

At column 5, line 51, after the word "as", delete "toward" and insert therefor --to--.

At column 8, line 36, after the word "direction", delete "intersects" and insert therefor --which--.

At column 14, line 36, after the word "said", delete "guided" and insert therefor --guide--.

Signed and Sealed this

Seventeenth Day of April, 2001

*Attest:*

NICHOLAS P. GODICI

*Attesting Officer*     *Acting Director of the United States Patent and Trademark Office*